3,099,978
ANIMAL ENCLOSURE
James W. George, St. Thomas, Pa.
Filed May 4, 1962, Ser. No. 192,439
4 Claims. (Cl. 119—19)

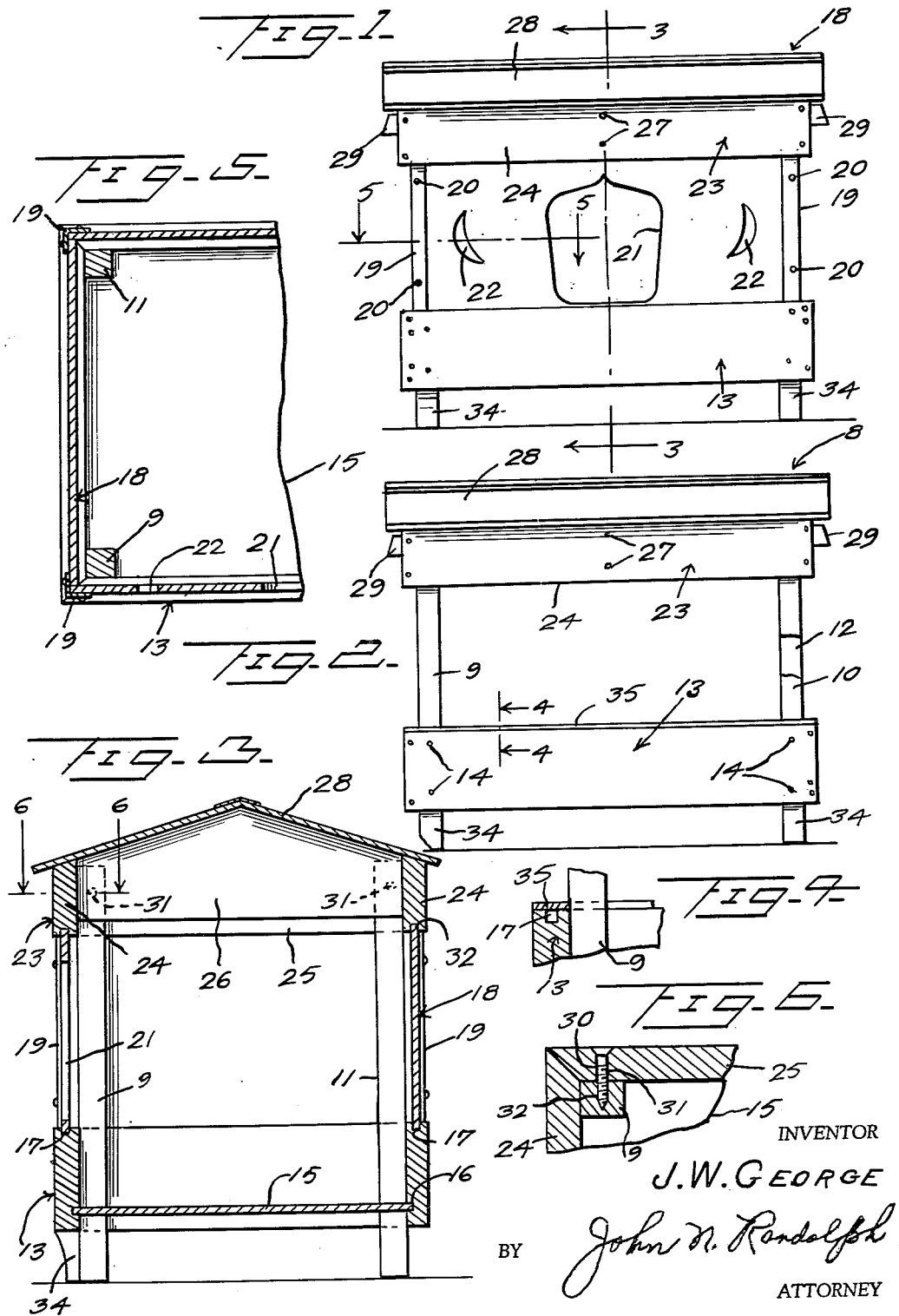

This invention relates to an enclosure, primarily for dogs, which is capable of use either indoors or out-of-doors and which includes a novel convertible feature.

More particularly, it is an aim of the present invention to provide an enclosure of extremely simple construction including an intermediate part which may be removed in warm weather to afford the animal a maximum amount of ventilation and which can be applied in cold weather to afford greater portection from cold, drafts or inclement weather.

A further object of the invention is to provide an enclosure which may be very economically manufactured and sold, which is readily convertible, which is light in weight yet durable, and which may be readily maintained in a clean and sanitary condition.

Various other objects and advantages of the invention will hereinafter become more fully apparent from the following description of the drawing, illustrating a presently preferred embodiment thereof, and wherein:

FIGURE 1 is a front elevational view of the completely assembled animal enclosure;

FIGURE 2 is a fragmentary front elevational view thereof with a part of the enclosure detached;

FIGURE 3 is a transverse sectional view, on an enlarged scale, taken substantially along the line 3—3 of FIGURE 1;

FIGURE 4 is an enlarged fragmentary sectional view, taken substantially along a plane as indicated by the line 4—4 of FIGURE 2;

FIGURE 5 is an enlarged fragmentary horizontal sectional view, taken substantially along a plane as indicated by the line 5—5 of FIGURE 1, and FIGURE 6 is an enlarged fragmentary horizontal sectional view taken through a corner of the enclosure, substantially along a plane as indicated by the line 6—6 of FIGURE 3.

Referring more specifically to the drawing, the animal enclosure in its entirety is designated generally 8 and includes four upright corner posts 9, 10, 11 and 12. A bottom rectangular frame 13 is disposed around the four corner posts and is secured thereto by suitable fastenings 14 so that the corner posts engage in the four corners of the frame 13. The frame 13 is of considerable width, as seen in FIGURES 1, 2 and 3, and the bottom edge thereof is spaced from the lower ends of the corner posts. A floor 15 is disposed within the bottom frame 13 and may be secured thereto in any suitable manner as by a tongue and groove joint 16, as seen in FIGURE 3. The floor 15 is located slightly above the bottom edge of the frame 13 and substantially below the top edge thereof. As seen in FIGURES 3, 4 and 5, the bottom frame 13 is of substantial thickness and has a continuous upwardly opening groove 17 in the upper edge thereof.

The enclosure 8 includes an intermediate rectangular frame section 18 which is substantially wider than the bottom frame 13, of substantially less thickness than said bottom frame, which is internally larger than the bottom frame and externally smaller than said bottom frame. The intermediate frame 18 fits detachably around the four corner posts and the bottom edge thereof seats in the groove 17, as seen in FIGURE 3. The intermediate frame 18 is reinforced by angular corner pieces 19, which may be formed of metal or other rigid material, and which are secured to the four corners and externally of the frame 18 by suitable fastenings 20. The corner members 19 have their ends spaced from the bottom and top edges of the frame 18, as seen in FIGURE 3. One long side of the frame 18, constituting the front side thereof, is provided with an entrance and exit opening 21 and said side may be additionally provided with small ventilating openings 22, as seen in FIGURE 1. However, said entrance opening 21 may be formed in any one of the four sides of the intermediate frame 18.

The enclosure 8 also includes a top cover frame 23 composed of corresponding sides 24, corresponding ends 25 and a cross brace 26 which extends between and is secured by fastenings 27 to the sides 24, midway between the ends 25. The cross brace 26 has a gabled upper portion, as seen in FIGURE 3, and the end members 25 have corresponding gabled top portions which combine with the gabled top portion of the brace 26 to support a gabled roof 28. Handles 29 are secured in any suitable manner to the outer sides of the end members 25. The end members 25 are provided with openings 30 to loosely receive screws 31 which threadedly engage in sockets 32 which open outwardly of the four corner posts, as seen in FIGURE 6. The bottom edges of the side members 24 and end members 25 are disposed coplanar, as seen in FIGURE 3, and below the plane of the bottom edge of the cross brace 26, and said bottom edges of the members 24 and 25 have a continuous groove 33 in which the upper edge of the frame 18 is received.

The front posts 9 and 10 are preferably provided with trim pieces 34 on their forward sides and below the bottom frame 13, as best seen in FIGURE 3.

The fully assembled animal enclosure 8, as illustrated in FIGURES 1, 3 and 5, affords adequate protection for an animal, such as a dog, from cold, drafts or precipitation and may be used either indoors or out-of-doors. The opening 21 constitutes an entrance and exit opening for the animal. In warm weather when the maximum air and ventilation is desirable, the four fastenings 31 are removed after which the upper frame 23, with the roof 28 which is secured thereto, may be lifted from the corner posts and from engagement with the intermediate frame 18, after which said intermediate frame can be removed. The top frame 23 is then re-applied and secured to the upper portions of the corner posts by repositioning the fastenings 31 therethrough and in engagement with the sockets 32, in order that the upper frame and roof will be supported solely by the corner posts. The enclosure 8 thus converted, as illustrated in FIGURE 2, will afford maximum ventilation yet will provide a roof. An animal, even indoors, prefers the enclosure 8, assembled as seen in FIGURE 2, to a bed without a roof and apparently obtains a sense of security and protection from having the top frame 23 and roof 28 disposed over the animal's bed which can be prepared on the bottom 15 and within the bottom frame 13. When the enclosure 8 is utilized without the intermediate frame 18, a flat rectangular frame 35 of a size corresponding to the bottom frame 13 and of a width corresponding to the thickness thereof may be positioned on said bottom frame, as seen in FIGURES 2 and 4, to prevent dirt accumulating in the groove 17. The handles 29 enable the enclosure 8 to be lifted and moved conveniently, in addition to enabling the top frame 23 and roof 28 to be removed from the corner posts, when the fastenings 31 are removed.

Various modifications and changes are contemplated and may be resorted to, without departing from the function or scope of the invention as hereinafter defined by the appended claims.

I claim as my invention:

1. An animal enclosure comprising upright corner posts, a rectangular bottom frame disposed around and secured to portions of the corner posts, a floor disposed within and secured to said bottom frame, a rectangular top frame disposed around and supported by upper portions of the corner posts above and spaced from the bottom frame, a roof secured to and disposed over said top frame, and a rectangular intermediate frame section detachably mounted on and supported by said bottom frame and disposed around said corner posts and extending between the bottom frame and top frame.

2. An animal enclosure as in claim 1, said intermediate frame having an entrance and exit opening.

3. An animal enclosure as in claim 2, and means detachably fastening the top frame to the corner posts.

4. An animal enclosure comprising upright corner posts, a rectangular bottom frame disposed around and secured to portions of the corner posts, a floor disposed within and secured to said bottom frame, a rectangular top frame disposed around and supported by upper portions of the corner posts above and spaced from the bottom frame, a roof secured to and disposed over said top frame, and an intermediate frame section detachably mounted on said bottom frame and disposed around said corner posts and extending between the bottom frame and top frame, the upper edge of said bottom frame and the bottom edge of the top frame having grooves in which the bottom and top edges, respectively, of the intermediate frame are received.

References Cited in the file of this patent
UNITED STATES PATENTS

| | | |
|---|---|---|
| 920,975 | Minion | May 11, 1909 |
| 1,518,832 | Wulf | Dec. 9, 1924 |
| 1,580,206 | Kern | Apr. 13, 1926 |
| 2,515,084 | Harris | Jan. 11, 1950 |